Sept. 19, 1939.        F. R. WEST        2,173,382
AIR RESISTANCE INDICATING MEANS FOR AUTOMOBILES
Filed Feb. 3, 1936        2 Sheets-Sheet 1

INVENTOR.
FRANK R. WEST.
BY
Barnes, Kissell, Laughlin & Raisch
ATTORNEYS

Patented Sept. 19, 1939

2,173,382

UNITED STATES PATENT OFFICE 2,173,382

AIR RESISTANCE INDICATING MEANS FOR AUTOMOBILES

Frank R. West, Detroit, Mich.

Application February 3, 1936, Serial No. 62,099

4 Claims. (Cl. 73—2)

This invention relates to air resistance indicating means for automobiles, and has to do particularly with air flow indicating means combined with ground speed indicating means for indicating the actual wind resistance against which the automobile is operating.

It has always been the object of much discussion between motorists as to just how much or how little effect wind resistance has on the propulsion of an automobile. Some motorists little appreciate the retarding effect of an adverse wind and often blame the result of such an adverse wind upon the motor or gasoline, or both. Still others appreciate the retarding effect of wind resistance but only hazard a guess as to how much wind the car is actually bucking.

It is an object of the present invention to provide means for quickly, accurately and visibly indicating the wind velocity against or with which the car is moving.

In its preferred form, the invention contemplates an air flow meter which may be positioned at any point on the car subject to free air flow, and preferably at the position usually occupied by the radiator cap or ornament, or some place between said point and the windshield. More specifically, this meter includes means adapted to be actuated by wind movement and operating against a calibrated spring in combination with indicating means actuated in unison with said first named means for indicating the amount of deflection of said first named means to indicate the air velocity relative to the moving car.

Other features of the invention have to do with details of construction and arrangement as to the air flow unit itself and the combination of the same with an indicator.

In its simplest preferred form, the present invention contemplates a direct reading unitary meter, having a movable portion subject to the air velocity past the car, the movement of said portion indicating direct the air velocity past the car in miles per hour. Such a unitary meter is shown as at 2, in Fig. 1, mounted on the hood 3 of an automobile in a position formerly occupied by a radiator cap. In direct reading types, this position has been found to be the best to insure safe driving as well as to visibly indicate the air velocity in miles per hour.

Figure 4:
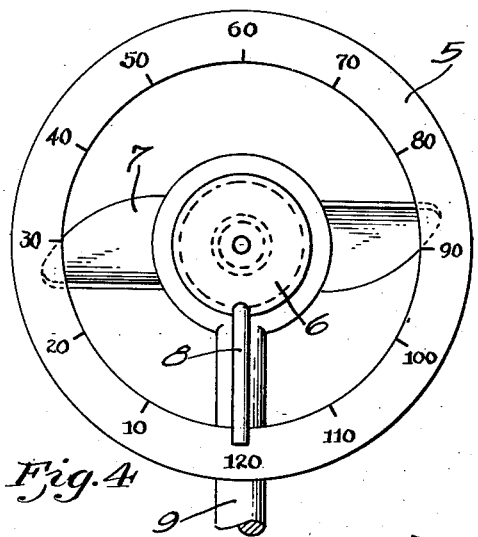
Figs. 4 and 5 are rear and front elevations of the embodiment illustrated in Figs. 2 and 3, respectively.
Figure 5:
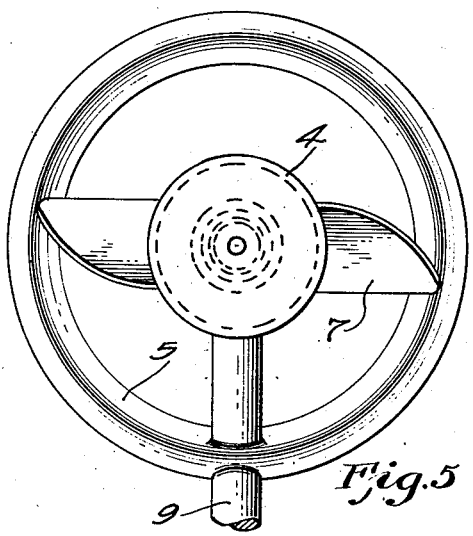

The air flow meter 2 in the embodiment illustrated in Figs. 2 to 6 comprises a streamlined nose or housing 4, stationary calibrated dial 5, a rear streamlined housing 6, carrying out the design of the nose 4 but positioned to the rear of the stationary dial 5, and vane members 7 formed as a part of the nose 4. A pointer or indicating arm 8 is formed as a part of the housing 6, and as best shown in Fig. 4 is adapted to indicate the actual air velocity in miles per hour as calibrated on the dial 5, said dial 5 being supported by any convenient standard 9.

A shaft 10 rotatably carries the housings 4 and 6 and movement of such housings by impact of the wind against the vanes 7 is controlled by a calibrated spring 11 secured to the housings 4 by the pin and socket connection 12 and to a stationary frame forming a part of the dial 5 by a pin and socket arrangement 13. The part that receives the pin 13 may be designated 14 and is held stationary relative to the dial 5 as by means of a set screw 15. As will be seen from the drawings, the vane members 7 are oppositely positioned and consequently the wind forces thereon will be fully resolved into rotating forces. There will thus be no bending or twisting forces to twist the housing 4 and the shaft 10.

The housings 4 and 6 move as a unit with the shaft 10, set screws 16 being utilized to insure this unitary movement. The spring 11 is so calibrated that for any given air speed or velocity against the vanes 7, the pointer 8 will register on the dial 5 any given velocity exactly in miles per hour, and at this point the indicator 8 becomes stationary and has no more movement, until the velocity of air changes, either more or less, then it moves to a new registration, and again becomes stationary.

Figure 6:
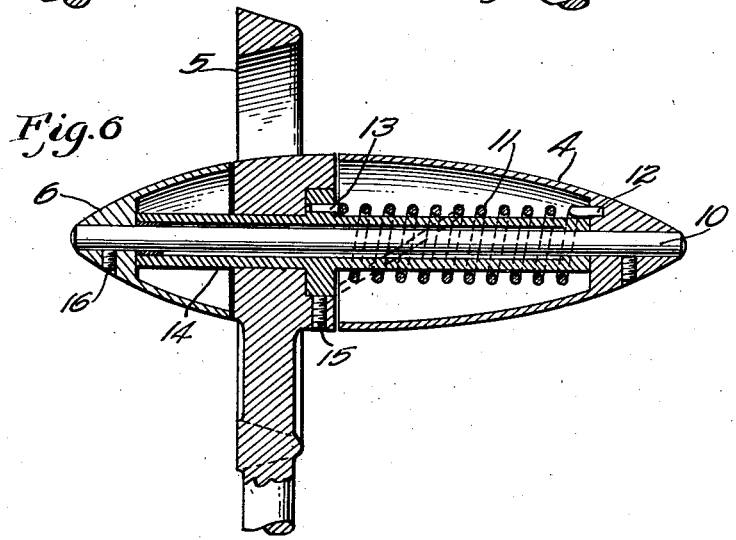
Fig. 6 is a longitudinal sectional view of the embodiment such as illustrated in Fig. 3 and showing particularly the positioning and arrangement of a calibrated spring for making possible the direct indicating of the air velocity past the car in miles per hour.

The structure as shown in detail in Fig. 6, is particularly adaptable to simple, inexpensive manufacture and ease in assembly. The member 14 in addition to removably receiving the end 13 of the spring 11 also forms a bearing for the shaft 10. After the end 12 of the spring has been inserted in the nose or housing 4, such housing may be assembled over the shaft 10 and adjusted until the end 13 of the spring takes position in the member 14, as shown in the Fig. 6; the housing 6 may then be assembled on the shaft 10. The correct positions of the housings 4 and 6 relative to the dial 5 may then be adjusted through the medium of the set screw 15 and/or 16.

Figure 1:
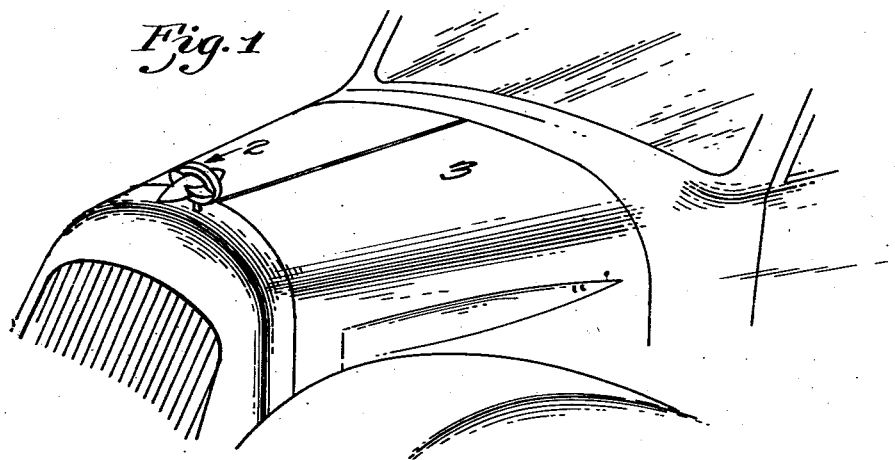
Fig. 1 is a fragmentary perspective view of an automobile having my air flow meter mounted in the position usually occupied by a radiator cap.
Figure 2:
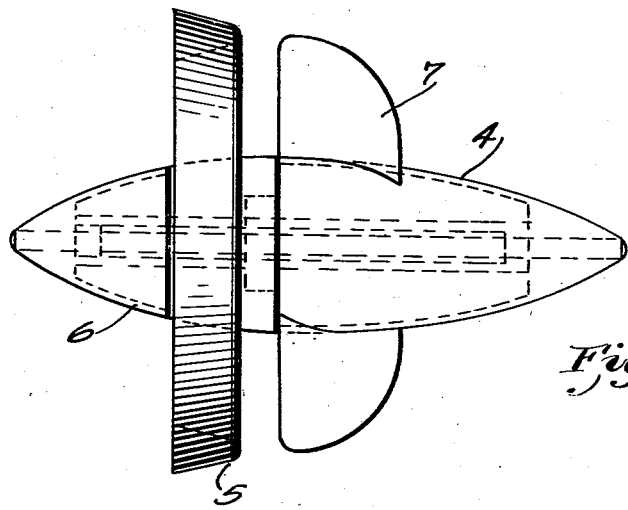
Fig. 2 is an enlarged plan view of one embodiment of my air flow meter utilizing vanes which are shown in horizontal position.
Figure 3:
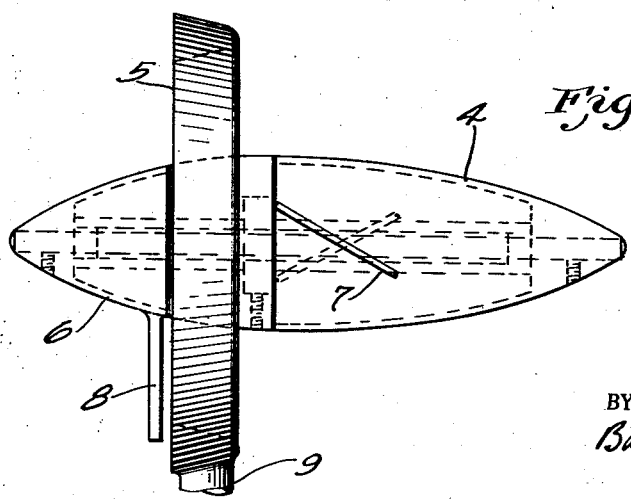
Fig. 3 is a side elevation of the structure shown in Fig. 2, and showing particularly the relation between the movable indicator and the calibrated dial.

It will be obvious to those skilled in the art that the air velocity contactor, whatever may be its form, may be positioned at any point on the car so as to be affected by the air velocity past the car; for example, the unitary direct reading meter as shown in Fig. 1, may obviously be positioned on one of the front fenders instead of on the hood.

It will thus be seen that I have provided an air flow meter which may be direct or indirect in indicating the air velocity in miles per hour. In a locality where the air is still, the air flow meter will register the same miles per hour as the road speed in miles per hour as registered by the speedometer. On the other hand, if the car is encountering a head wind of 40 miles per hour, then the air flow meter will register 100 miles per hour when the car speedometer would register 60 miles per hour. Again, if the car is affected by a tail wind of say 40 miles per hour, then the air flow meter would register 20 miles per hour when the car speedometer would register 60 miles per hour. The air flow meter may take various shapes and designs, all of which may be ornamental and fit in with the design of the car on which it is used. Being mounted on the front of the car, in the line of vision, it will not be necessary for the driver in reading the instrument, to take his eyes off the road. It will be seen that my air flow meter is particularly efficacious in demonstrating the relative wind resistance of different types of streamlined automobile bodies.

What I claim is:

1. A device for indicating head winds which a vehicle encounters comprising, a support, a dial having indicia thereon, said support adapted to be mounted upon a vehicle in the position where it is exposed to the flow of air past the vehicle, bearing means carried by the support, a housing member journaled in the bearing means with its axis extending fore and aft of the vehicle and substantially in a horizontal plane, an indicator carried by the member for movement across the dial, a plurality of vanes on the member extending in substantially opposite directions from the axis adapted to be acted upon by the flow of air for rocking the member on its axis, said vanes being arranged so that the air pressure thereon is substantially balanced to minimize twisting action of said member on its axis, and a coil spring surrounding the axis connected at one end to the member and at its opposite end to the support, said spring being arranged to normally hold the member and its indicator in non-indicating position and resisting rocking motion of the member incident to air pressure on the vanes, said spring and indicia on the dial being so calibrated that the flow of air past the vehicle is indicated in miles per hour.

2. An air flow meter adapted to be positioned at a point on a vehicle subject to free air flow, comprising a support, an open housing directly exposed to the atmosphere and rotatably mounted on said support and adapted to directly contact with the wind, freely exposed vanes positioned on said housing tending to rotate the same because of the force of the wind, a calibrated spring positioned to oppose the movement of said housing, a calibrated dial carried by said support, and a pointer movable in unison with said housing and relative to said calibrated dial.

3. An air flow meter adapted to be positioned at a point on a vehicle subject to free air flow, comprising a support, an open housing rotatably mounted on and positioned at the head of said support and adapted to directly contact with the wind, freely exposed vanes positioned on said housing tending to rotate the same because of the force of the wind, a calibrated spring positioned to oppose the movement of said housing, an annular calibrated dial carried by said support and spaced from and enclosing said housing, and a pointer positioned on the opposite side of the dial from said housing and movable in unison with said housing and relative to said calibrated dial.

4. An air flow meter adapted to be positioned at a point on a vehicle subject to free air flow, comprising a support, a streamlined housing rotatably mounted on and positioned at the head of said support and adapted to directly contact with the wind, a pair of freely exposed vanes positioned on said housing tending to rotate the same because of the force of the wind, a calibrated spring positioned to oppose the movement of said housing, a calibrated dial carried by said support, a pointer movable in unison with said housing and relative to said calibrated dial, and a streamlined housing positioned on the opposite side of said calibrated dial from said first named housing.

FRANK R. WEST.